(12) United States Patent
Nemoto et al.

(10) Patent No.: US 7,990,010 B2
(45) Date of Patent: Aug. 2, 2011

(54) SMALL MOTOR OF POLYGONAL EXTERNAL SHAPE

(75) Inventors: Nobuyuki Nemoto, Matsudo (JP); Hiroshi Yamazaki, Matsudo (JP)

(73) Assignee: Mabuchi Motor Co., Ltd., Matsudo-shi, Chiba (JP)

( * ) Notice: Subject to any disclaimer, the term of this patent is extended or adjusted under 35 U.S.C. 154(b) by 0 days.

(21) Appl. No.: 12/663,100

(22) PCT Filed: Apr. 11, 2008

(86) PCT No.: PCT/JP2008/057145
§ 371 (c)(1),
(2), (4) Date: Dec. 4, 2009

(87) PCT Pub. No.: WO2008/149603
PCT Pub. Date: Dec. 11, 2008

(65) Prior Publication Data
US 2010/0156203 A1      Jun. 24, 2010

(30) Foreign Application Priority Data
Jun. 8, 2007   (JP) ................................ 2007-153064

(51) Int. Cl.
*H02K 21/26*   (2006.01)
(52) U.S. Cl. .......... 310/154.03; 310/154.07; 310/154.08
(58) Field of Classification Search ............ 310/154.01, 310/154.03, 154.06–154.08, 154.21, 154.25, 310/154.29, 154.36
See application file for complete search history.

(56) References Cited

U.S. PATENT DOCUMENTS

| 4,464,595 | A | * | 8/1984 | Hamano et al. | 310/154.07 |
|---|---|---|---|---|---|
| 5,201,111 | A | * | 4/1993 | Prohaska | 29/596 |
| 6,995,488 | B1 | * | 2/2006 | Yamashita et al. | 310/154.21 |
| 7,427,817 | B2 | * | 9/2008 | Uenishi et al. | 310/154.22 |
| 7,528,515 | B2 | * | 5/2009 | Kuroda | 310/154.21 |
| 7,732,962 | B2 | * | 6/2010 | Kuroda | 310/154.01 |
| 7,800,270 | B2 | * | 9/2010 | Kuroda | 310/154.01 |
| 2006/0279159 | A1 | | 12/2006 | Kuroda | |
| 2010/0102662 | A1 | * | 4/2010 | Wong et al. | 310/154.25 |

FOREIGN PATENT DOCUMENTS

| JP | 55-178276 | 12/1980 |
|---|---|---|
| JP | 63-114550 | 5/1988 |
| JP | 64-12455 | 1/1989 |
| JP | 07-059322 | 3/1995 |
| JP | 2007-006688 | 1/2007 |

* cited by examiner

*Primary Examiner* — Dang D Le
(74) *Attorney, Agent, or Firm* — McGlew and Tuttle, P.C.

(57) ABSTRACT

A side wall of a motor casing is formed into a polygonal shape such that flat side portions and corner portions located at respective corners between the side portions are continuously joined together. A field magnet, which has an outer circumferential shape approximately coinciding with the inner circumferential shape of the motor casing, has magnet side portions and magnet corner portions, and has a rib provided on outer circumferential surfaces of the magnet side portions. The magnet is disposed, through press-fitting, within the motor casing such that at least the rib comes into contact with the inner circumferential surface of the motor casing, wherein the magnet side portions, excluding the rib, are formed such that small clearances are formed between the magnet side portions and the side portions of the motor casing.

5 Claims, 6 Drawing Sheets

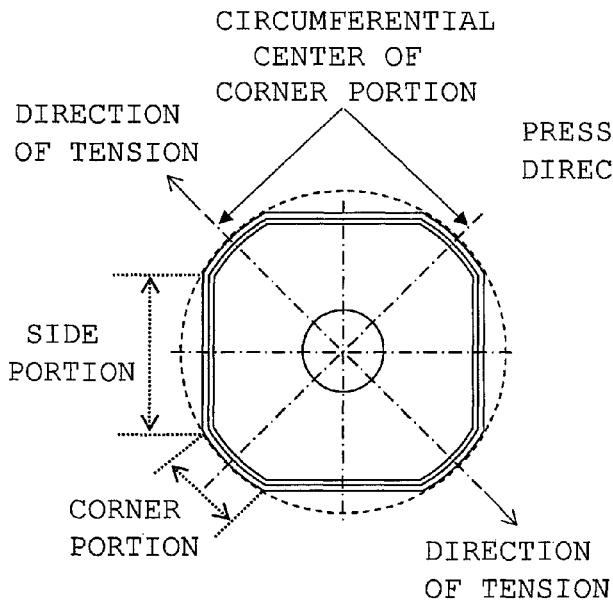
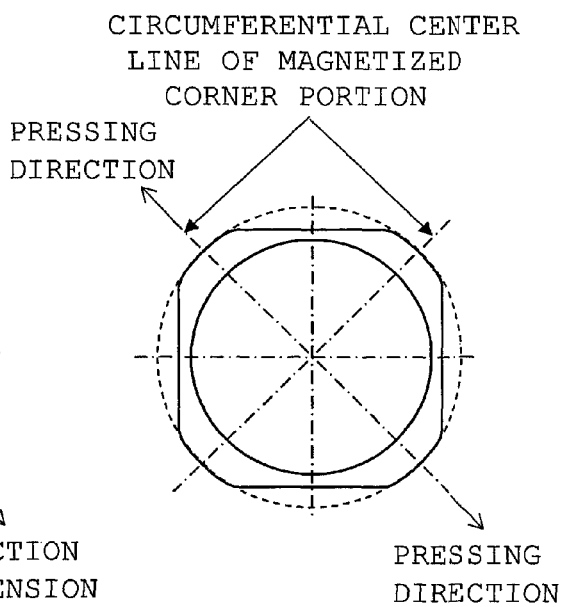
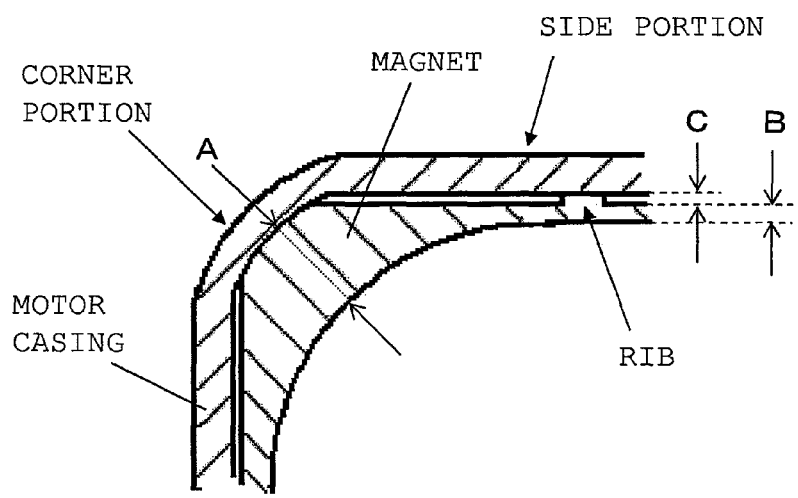

PORTION X

FREQUENCY, 4~20 (kHz)

FREQUENCY, 4~20 (kHz)

FREQUENCY, 4~20 (kHz)

THICKNESSES OF VARIOUS PORTIONS
OF MOTOR CASING

SMALL MOTOR OF POLYGONAL EXTERNAL SHAPE

TECHNICAL FIELD

The present invention relates to a small motor having a polygonal external shape which can be used in an air conditioner actuator, a motor-driven retractable mirror, etc., and more particularly to a small motor designed to suppress vibration of a field magnet and vibration of a motor casing to which the field magnet is attached.

BACKGROUND ART

In an ordinary small motor, the outer circumferential surface of its motor casing has a circular shape (round shape). When such a round motor is to be mounted in an apparatus or on a wiring board, a whirl-stop must be employed for preventing rotation of the motor. When the round motor is mounted in an apparatus, the round shape tends to be accompanied by wasted space within the apparatus. Thus, in view of prevention of rotation of a motor in relation to a mounting surface and space efficiency, there is known impartment of a quadrangular or higher polygonal external shape to a motor.

Meanwhile, there has been known a motor which has a quadrangular external shape and in which a quadrangular magnet is used unlike the case of the above-descried round motor (Patent Documents 1, 2, and 3). The quadrangular external shape of the motor prevents rotation of the motor in relation to a mounting surface and enhances the space efficiency. However, in the case of a motor which has a quadrangular external shape and in which a quadrangular magnet is used, the motor casing has flat wall portions, which generate large vibrations, thereby causing a problem of vibration and noise.

FIG. 9 is a sectional view showing a motor which is described in Patent Document 3 and in which the magnetic poles are disposed at the respective corners between the side portions of the motor casing. In FIG. 9, the motor casing (yoke) has a quadrangular section and accommodates therein a 4-pole field magnet magnetized with alternating N and S poles. This field magnet is magnetized such that the centers of magnetic poles are located at the respective corners between the side portions of the yoke. The motor in which magnetic poles are disposed at the respective corners between the side portions not only enables the magnet to be formed in a smaller size and be efficiently disposed, but also can reduce cogging torque. However, since the motor casing of the motor has flat wall portions of a fixed thickness, the motor has a problem in that the flat wall portions vibrate and generate a large noise.

In order to improve productivity, desirably, the field magnet of a small motor is manufactured separately from the motor casing (yoke) and is then assembled with the yoke. Usually, such assembly employs a press-fit technique. However, in actuality, press-fitting cannot be performed in such a manner that the entire outer circumferential surface of the magnet uniformly comes into contact with the inner circumferential surface of the motor casing. Therefore, in the motor structure as shown in FIG. 9, the corner portions of the magnet are bought into close contact with the inner circumferential surface of the motor casing, particularly, at the apexes of magnetic poles of the magnet at which the magnetic field intensity must be increased. Therefore, there must be employed a design method in which corner portions of the magnet are fixed by means of press-fitting and a slight clearance is provided between each of the flat portions of the magnet and the motor casing. When the structure in which the corner portions of the magnet are fixed by means of press-fitting is employed, vibrations of the flat wall portions become smaller than those in the case where the magnet is not press-fitted. However, the vibration reducing effect is still insufficient in applications in which more reduction of vibrations is required.

[Patent Document 1] Japanese Patent Application Laid-Open (kokai) No. H7-59322

[Patent Document 2] Japanese Utility Model Application Laid-Open (kokai) No. S64-12455

[Patent Document 3] Japanese Patent Application Laid-Open (kokai) No. 2007-6688

DISCLOSURE OF THE INVENTION

Problems to be Solved by the Invention

A small motor having a polygonal external shape has a plurality of flat side surfaces (flat wall portions), and corner surfaces (corner portions) connecting the flat side surfaces, and the motor casing and the magnet located within the motor casing must be brought into close contact with each other, particularly at the corner portions. Therefore, vibrations of the flat wall portions become strong, and increase the level of noise. In applications such as those for air conditioner dampers in which noises and vibrations must be reduced to a considerably low level, measures must be taken for noises and vibrations of low level which would not considered a problem in other applications.

An object of the present invention is, in a small motor having a polygonal external shape employed in view of whirl-stop of the motor and space efficiency, to suppress vibrations of flat wall portions of the motor casing to thereby reduce noise and shift the vibration frequency from a frequency at which the noise is harsh to a higher frequency at which the noise is less audible, while improving motor performance by causing the magnet to produce effectively functioning magnetic flux.

Means for Solving the Problems

The present invention provides a small motor having a polygonal external shape in which a field magnet having four or more poles is attached to an inner circumferential surface of a motor casing made of metal. A side wall of the motor casing is formed into a polygonal shape such that flat side portions equal in number to the poles, and arcuate corner portions equal in number to the side portions and located at respective corners between the side portions are continuously joined together. The field magnet, which has an outer circumferential shape. approximately coinciding with the inner circumferential shape of the motor casing, has magnet side portions and magnet corner portions, which correspond to the side portions and corner portions, respectively, of the motor casing. The field magnet also has a rib provided on outer circumferential surfaces of the magnet side portions. The magnet is disposed, through press-fitting, within the motor casing such that at least the rib comes into contact with the inner circumferential surface of the motor casing, wherein the magnet side portions, excluding the rib, are formed such that small clearances are formed between the magnet side portions and the side portions of the motor casing, or at least such that no pressing force acts on the magnet side portions, excluding the rib.

The motor casing and the magnet are bonded together by means of adhesive injected into the small clearances formed between the inner circumferential surface of the motor casing and the outer circumferential surface of the magnet as a result of provision of the rib on the outer circumferential surface of the magnet. The rib is provided at a single position or a plurality of positions, and assumes the form of a ridge having a rectangular, arcuate, or semicircular cross section, and elongated in the longitudinal direction of the magnet. The rib may be provided on the inner circumferential surface of the motor casing, rather than being provided on the outer circumferential surface of the magnet. The magnet may be integrally formed into the overall shape of a ring from a magnetic plastic compound.

EFFECT OF THE INVENTION

According to the present invention, in a small motor having a polygonal external shape employed in view of whirl-stop of the motor and space efficiency, it is possible to suppress vibrations of flat wall portions of the motor casing to thereby reduce noise and shift the vibration frequency from a frequency at which the noise is harsh to a higher frequency at which the noise is less audible, while improving motor performance by causing the magnet to produce effectively functioning magnetic flux.

Thus, the present invention can provide a small motor which has a 4-pole field magnet, which can be efficiently produced at low cost, and which is excellent in terms of noise and vibration level.

Since the flat wall portions of the housing (motor casing) are fixed by the ribs of the magnet press-fitted into the housing, the vibration frequency increases about 11%, and moves closer to a frequency band in which the hearing sensitivity of the human ear lowers. Further, the amplitude of the vibration can be reduced by about 50%. In addition, through bonding and fixing together the outer flat surfaces of the magnet and the inner flat surfaces of the motor casing, the amplitude of the vibration can be further reduced by about 80%.

BRIEF DESCRIPTION OF THE DRAWINGS

FIGS. 3(A) and 3(B) are side views showing the motor casing and a magnet, respectively.

FIG. 4 is an enlarged view showing one corner portion and one side portion of the magnet disposed within the motor casing.

BEST MODE FOR CARRYING OUT THE INVENTION

Figure 1:
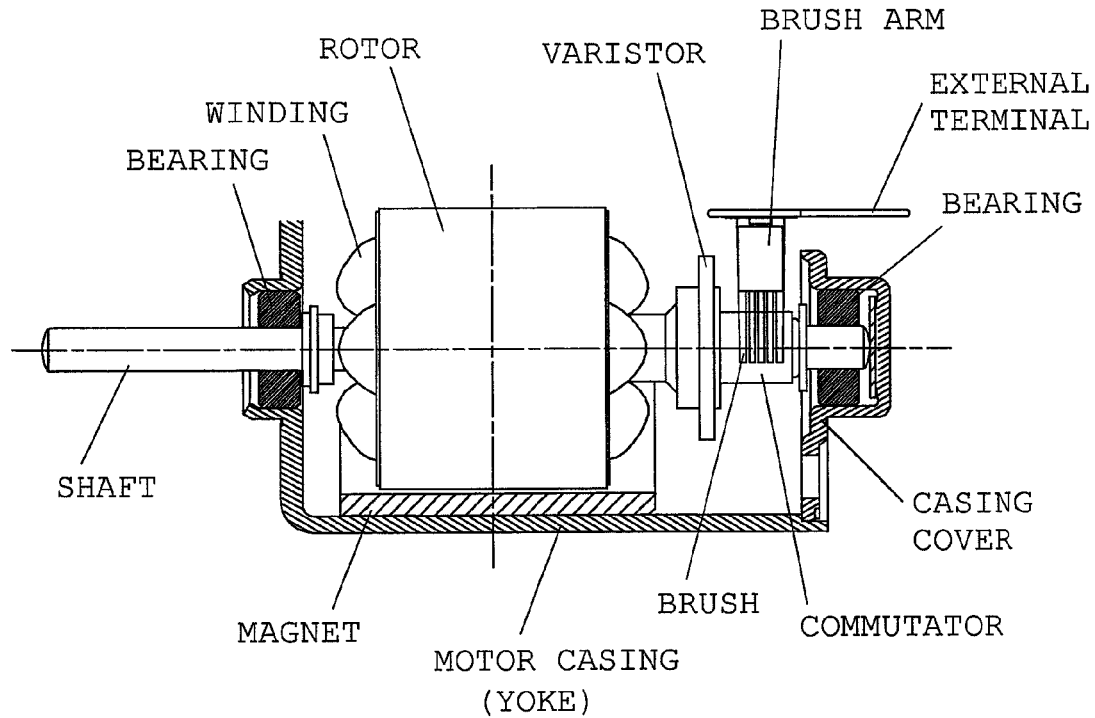
FIG. 1 is a longitudinal, partially sectional view showing the configuration of a small motor having a polygonal external shape which embodies the present invention.
Figure 2:
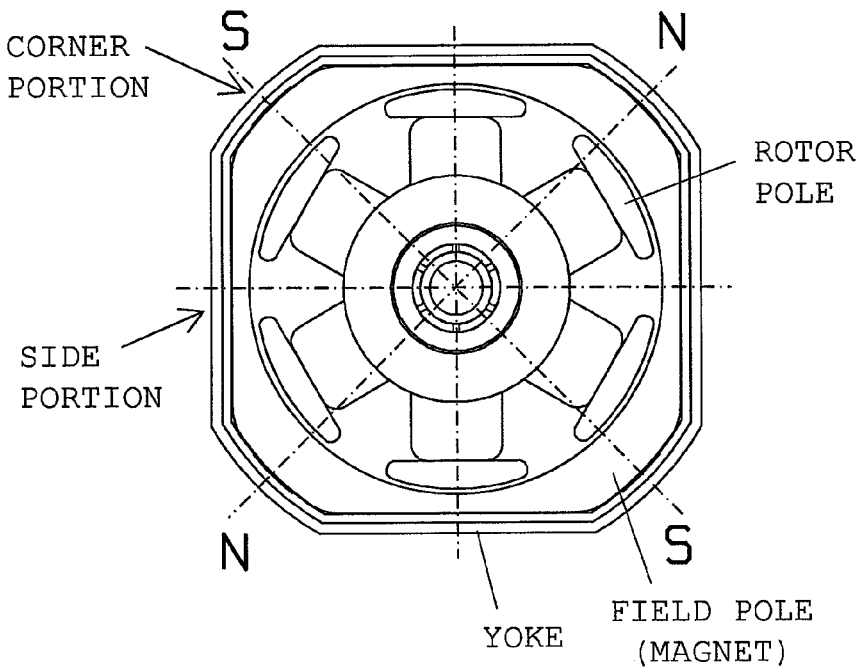
FIG. 2 is a side view of the motor shown in FIG. 1 as viewed from the commutator side with a casing cover removed.

The present invention will now be described by way of example. FIG. 1 is a longitudinal, partially sectional view showing the configuration of a small motor having a polygonal external shape which embodies the present invention. FIG. 2 is a side view of the motor shown in FIG. 1 as viewed from the commutator side with a casing cover removed. A small motor having a 4-pole field magnet and six rotor poles will be described below. However, the present invention can be applied to a small motor which has four or more field poles (e.g., four poles, six poles, or eight poles) and three or more rotor poles.

As illustrated, the magnet is attached to the inner circumferential surface of a motor casing, which is formed from a metallic material into a closed-bottomed tubular shape by press working. A polygonal side wall of the motor casing made of metal serves as a yoke, which, in turn, serves as a magnetic path of the magnet. A casing cover is fitted to an opening portion of the motor casing. A shaft of a rotor is supported by bearings provided respectively at a central portion of the casing cover and at the center of a bottom portion of the motor casing. A rotor configured on the shaft includes a rotor pole structure, which is composed of a pole core and windings wound on the pole core. A commutator is fixed on the shaft and has a varistor at an end portion thereof for quenching sparks. Brushes (a pair) in contact with the commutator are supported by the casing cover via respective brush arms and are externally supplied with power via respective external terminals connected to the brush arms.

FIGS. 3(A) and 3(B) are side views showing the motor casing and the magnet, respectively. The magnet is radially magnetized and has four poles such that N and S poles alternate in the circumferential direction. The illustrated magnet is integrally formed from a magnet material into the overall shape of a ring. This ring-shaped magnet has an inside diameter slightly greater than the outside diameter of the rotor and has a nonuniform thickness such that side portions thereof are thin-walled, whereas corner portions thereof are thick-walled. Such a magnet may be formed as follows. A magnetic material is integrally formed into a ring shape having a non-uniform thickness; the ring-shaped magnetic material is fixed into the motor casing; and then, by use of a magnetic-field generator, the ring-shaped magnetic material is magnetized from the outside of the motor casing so as to have four magnetized portions (poles).

As illustrated, the side wall of the motor casing, the side wall serving as a yoke, is configured such that (four) flat side portions equal in number to the field poles (four poles in the illustrated example), and (four) corner portions equal in number to the four side portions and located at respective corners between the side portions are continuously joined together. Since the side portions are formed flat, the side portions function as a whirl-stop in the course of mounting of the motor, and also wasted space around the outer circumferential surface of the motor is reduced, thereby improving space efficiency. The corner portions (corner surface portions) fixedly support the magnet at the inner sides of the corner portions and each assume a curved shape. In the case where each of the corner portions is curved along an arc whose center is located at the rotary shaft of the motor, the magnet has a fixed radial thickness at each corner portion. However, the magnet is not necessarily required to have a completely fixed radial thickness. Therefore, each of the corner portions may have a curved surface other than the arcuate surface whose center is located at the rotary shaft of the motor.

The magnet is formed such that its corner portions come into contact with the yoke. Meanwhile, the side portions, excluding rib portions to be described later, are formed such that small clearances are formed or at least such that no pressing force acts on the side portions, excluding rib portions. Therefore, the magnet can be fixed to the yoke through press-fitting. As described above, the magnet has an outer circumferential shape which approximately coincides with the inner circumferential shape of the motor casing having a substantially uniform thickness. Therefore, the magnet has corner portions and side portions corresponding to those of the motor casing. The circumferential centers of the magnetized portions (apexes of field poles) coincide with those of the corresponding corner portions of the yoke. When the ring-shaped magnet is press-fitted for surface contact with the corner portions of the yoke, opposite ends of each side portion of the yoke are pulled away from each other. In addition, ribs are provided as described below. Thus, the rigidity of the side portions of the motor casing is increased, and vibration of the motor casing during rotation can be suppressed.

The shape of the magnet will be further described with reference to FIG. 4. The magnet is formed of a magnet material, such as a plastic compound formed by mixing a magnetic material (e.g., ferrite or neodymium) into resin, such that four poles are integrally formed. FIG. 4 is an enlarged view showing one corner portion and one side portion of the magnet disposed within the motor casing.

The radial thickness of each pole of the magnet decreases from a region corresponding to the respective corner portion (magnet thickness dimension A) toward the adjoining magnetic poles (magnet thickness dimension B) so as to become equal to the radial thickness of the flat side portions of the yoke. The side portions of the magnet are not in contact with the side portions of the yoke, through provision of a small clearance (dimension C) therebetween. The magnet assumes the overall shape of a ring whose inside diameter is slightly greater than the outside diameter of the rotor; however, the ring shape is such that its side portions are thin-walled, whereas its corner portions are thick-walled. Since the magnet has a nonuniform radial thickness as mentioned above, the magnetic flux of the magnet smoothly reduces at the side portions of the magnet as the circumferential distance from the circumferential centers of the corner portions of the magnet increases, whereby cogging torque can be lowered. At the same time, at the circumferential centers of the magnetized corner portions, the magnet has such a thickness as to generate a sufficient magnetic field, and the magnet is pressed closely against the yoke, whereby the intensity of magnetic field can be enhanced for improving motor performance.

Figure 5:
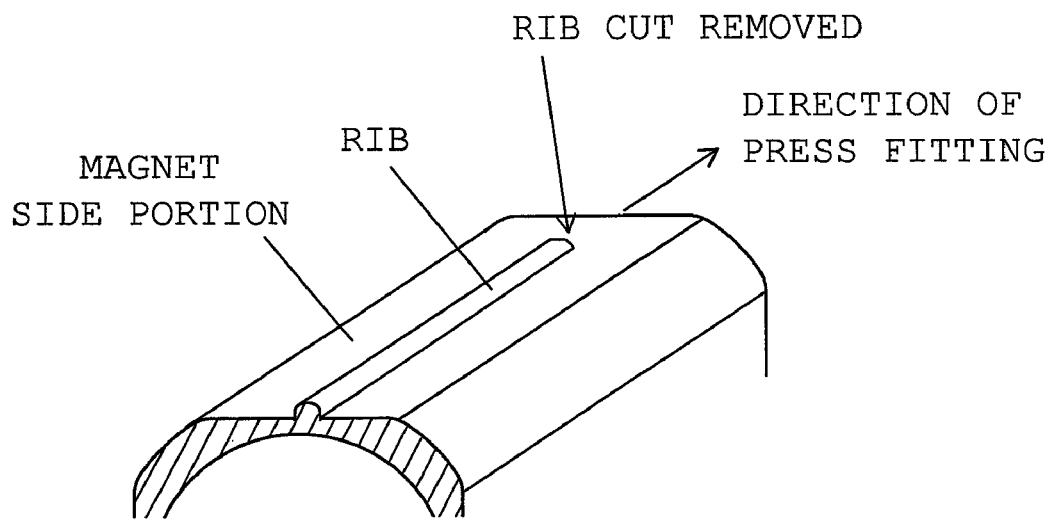
FIG. 5 is a view showing another example in which the rib has a shape different from that of the rib shown in FIG. 4.

Further, as shown in FIG. 4, ribs are provided on the magnet of the present invention. The magnet is radially magnetized such that N and S poles alternate in the circumferential direction. A pole changeover region is present between adjacent magnetic poles; i.e., at the center of the corresponding side portion. In the pole changeover regions, the outer circumferential surface of the magnet is pressed against the inner circumferential surface of the housing via the ribs provided on the outer circumferential surface of the magnet. The ribs have a rectangular cross section as shown in FIG. 4. Alternatively, as shown in FIG. 5, each rib may assume an arbitrary ridge-like form which has an arcuate or semicircular cross section and extends in the longitudinal direction of the magnet (see FIG. 5). The rib length is not necessarily required to be equal to the length of the magnet, and each rib can provide its function sufficiently when the rib has a length greater than half the length of the magnet. The rib shown in FIG. 5 is cut-removed at the end on the press-fitting side so as to facilitate press-fitting of the magnet into the motor casing.

Since the ribs are provided on the outer circumferential surface of the magnet, through concentrated control performed only on the height (dimension C shown in FIG. 4) of the ribs and the inner diameter of the motor casing, it becomes possible to realize a highly productive method of fixing the motor casing and the magnet, and suppress vibrations of the side portions of the motor casing.

Notably, in the illustrated example, a single rib is provided between the adjacent magnetic poles. However, a larger number of ribs may be provided at predetermined intervals. Alternatively, the ribs may be provided on the inner circumferential surface of the motor casing. Even in such a case, vibrations of the surfaces of the motor casing can be suppressed. Further, vibrations of the flat wall portions of the motor casing can be suppressed further by means of bonding between the ribs and the inner circumferential surface of the motor casing.

Figure 6A:
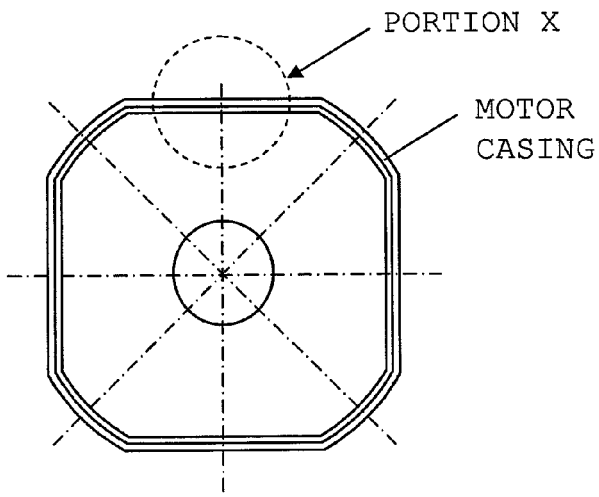
FIG. 6(A) shows the above-described motor casing (see FIG. 3(A)), FIG. 6(B) specifically shows a portion X of FIG. 6(A)
Figure 6B:
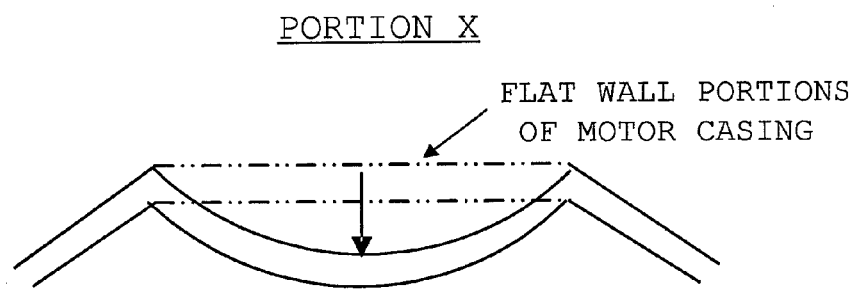
FIG. 6(C) is a pair of illustrations used for describing vibrations of the motor casing.
Figure 6C:
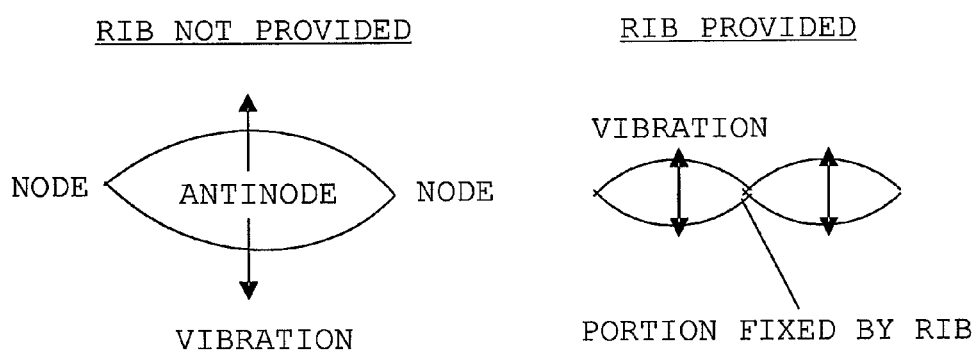

FIGS. 6(A), 6(B) and 6(C) are a set of illustrations used for explaining vibrations of the housing. FIG. 6(A) shows the above-described motor casing (see FIG. 3(A)), and FIG. 6(B) specifically shows a portion X of FIG. 6(A). FIG. 6(C) is a pair of illustrations used for describing vibrations of the motor casing. From the viewpoint of design, the magnet is desirably press-fitted into the motor casing in such a manner that, of the side potions of the motor casing, only center portions of the side portions engage with the magnet. The motor casing manufactured through press working distorts radially inward; i.e., in a direction indicated by an arrow in FIG. 6(B). When surface contact is required to be established between the entirety of each flat surface of the magnet and the entirety of a corresponding flat surface of the motor casing through press-fitting, the entire inner circumferential surface of the motor casing and the entire outer circumferential surface of the magnet must be subjected to dimensional control. In such case, the accuracy of dies used for manufacturing the motor casing and the magnet must be increased, leading to an increase in cost. In contrast, in the case where the motor casing and the magnet are manufactured while the dimensions of the center portions of their flat surfaces are chiefly controlled, and the magnet is press-fitted into the motor casing, it is possible to efficiently manufacture motors while reducing variation in noise and vibration level among the motors. Further, as a result of provision of the ribs on the outer circumferential surface of the magnet, a small clearance (dimension C shown in FIG. 4) is produced between the inner circumferential surface of the motor casing and the outer circumferential surface of the magnet. Since adhesive is injected into the clearance so as to bond the motor casing and the magnet together, the rigidity of the flat wall portions increases, and the noise and vibration of the motor can be reduced further. Further, in order to attain the vibration suppressing effect to the greatest extent, press-fitting regions are desirably provided at the central portions of the flat wall portions which vibrate most strongly.

When no ribs are provided, as shown in the upper side of FIG. 6(C), a flat wall portion vibrates in a state where the opposite press-fitted portions serve as nodes and the center of the flat wall portion serves as an antinode. In contrast, in the case where the center of the flat wall portion is fixed by means of a rib, the center of the flat wall portion also serves as a node. Therefore, theoretically, the vibration frequency increases. The increase in the vibration frequency is considered to be proportional to the number of ribs. This was confirmed from the results (Table 1) of a test in which test samples were manufactured and their vibration frequencies were actually measured. Table 1 is a table which shows the vibration frequency of a flat wall portion of the housing measured for the test samples having different numbers of ribs.

TABLE 1

|  | Number of ribs | | | |
|---|---|---|---|---|
|  | 0 | 4 | 16 | 20 |
| Vibration frequency (kHz) | 10.8 | 13.5 | 14.5 | 14.7 |

As can be understood from Table 1, the vibration frequency increases with the number of ribs. When the number of ribs is 20 (4 surfaces×5 ribs/surface), the vibration frequency is 14.7 kHz, which is higher than the vibration frequency of 10.8 kHz measured in the case where the number of ribs is zero, and which is close to a frequency band in which the hearing sensitivity of the human ear lowers. Notably, in the case where 16 ribs or 20 ribs are provided as shown in Table 1, the ribs are provided at equal intervals on each side portion. Although decreasing the amplitude of vibration is a general measure against noise, intentionally shifting the vibration frequency to a frequency band in which the hearing sensitivity of the human ear lowers is also effective.

Figure 7A:
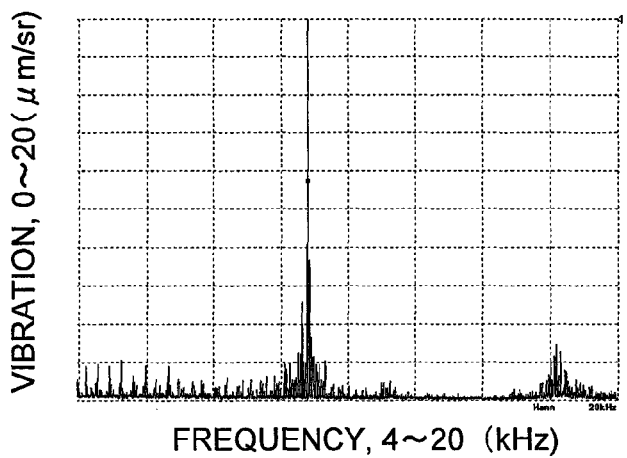
FIGS. 7(A), 7(B) and 7(C) are graphs showing results (actually measured values) obtained through frequency analysis of vibrations of flat surfaces of a housing, FIG. 7(A) showing the results obtained for the case where no rib is press-fitted, FIG. 7(B) showing the results obtained for the case where four ribs are press-fitted, FIG. 7(C) showing the results obtained for the case where four ribs are press-fitted and the ribs and the yoke are bonded and fixed together.
Figure 7B:
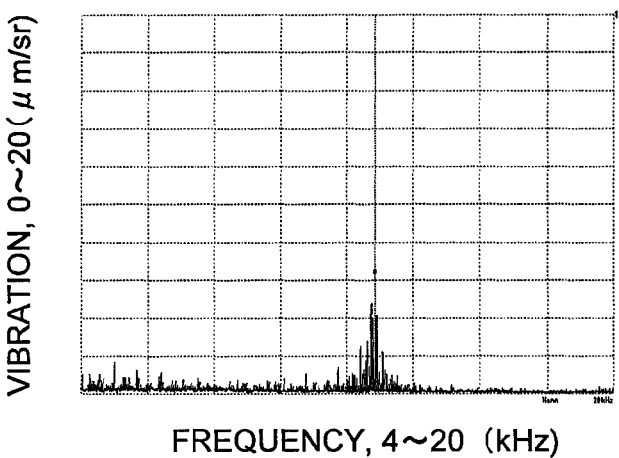
Figure 7C:
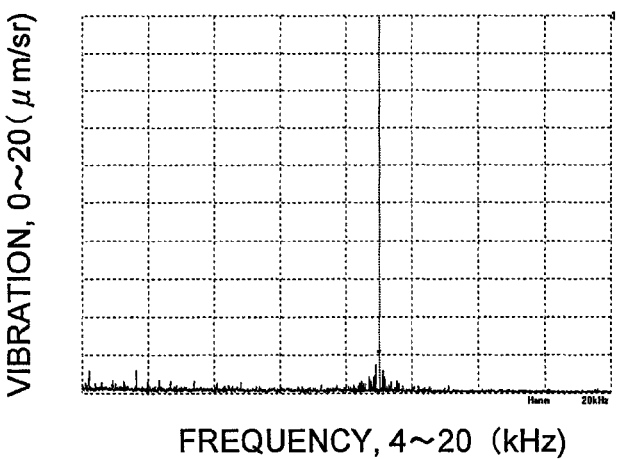

FIGS. 7(A), 7(B) and 7(C) show results (actually measured values) obtained through frequency analysis of vibrations of flat surfaces of a housing for the case where ribs are press-fitted and the case where no rib is press-fitted. FIG. 7(A) is a graph showing the results obtained for the case where no rib is press-fitted; FIG. 7(B) is a graph showing the results obtained for the case where four ribs are press-fitted; and FIG. 7(C) is a graph showing the results obtained for the case where four ribs are press-fitted and the ribs and the yoke are bonded and fixed together. Providing four ribs means that one rib is provided at the center of each of four flat surfaces. The horizontal axis represents vibration frequency, and the vertical axis represents the amplitude (velocity) of vibration. Vibration of the flat portions at the time when the motor rotates at 3500 rpm as a result of application of DC 12V thereto is shown in a central portion of each graph. Table 2 shows the vibration frequency and vibration peak of the flat surfaces for different motors having different specifications, as read from the graphs of FIGS. 7(A), 7(B) and 7(C).

TABLE 2

| Specifications | Vibration frequency(kHz) | Vibration peak value (µm/sr) |
|---|---|---|
| No rib is press-fitted | 10.8 | 12.87 |
| Ribs are press-fitted | 12.9 | 6.50 |
| Ribs are press-fitted and fixed fitted and fixed through bonding | 13.0 | 2.24 |

In the case where no rib is press-fitted, the vibration frequency is 10.8 kHz, which is high frequency, and a harsh grating noise is generated. The results of analysis performed on the vibration show that the vibration of the magnet is greater in amplitude than the vibration of the housing wall. From the results of these analyses, the inventors considered that the energies of attraction and repulsion between the rotor and the magnet produced when the motor is driven serve as a vibration source, and the thin-walled portions of the magnet, each of which serves as the center of a chord (antinode of vibration), excite the corresponding flat wall portions of the housing from the inside thereof. Further, from the results obtained by analyzing the magnet alone, it was found that the thin-walled portions of the magnet are apt to vibrate with a large amplitude. This result also shows that the vibrations of the flat wall portions of the housing become large because the magnet excites the inner circumferential surfaces of the flat wall portions of the housing.

Figure 8:
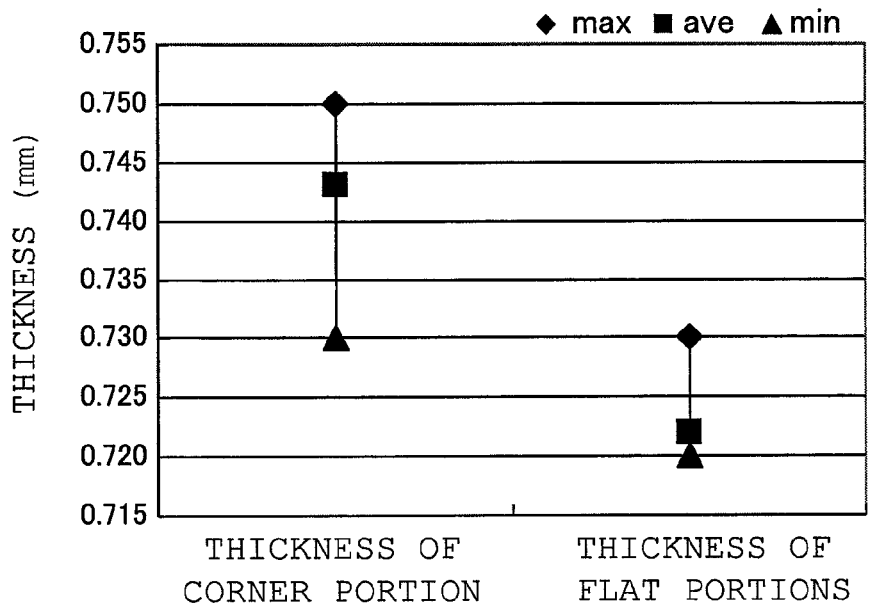
FIG. 8 is a graph showing the thickness of a motor casing formed from an iron plate through press working, as measured at the corner portions and flat wall portions thereof.
Figure 9:
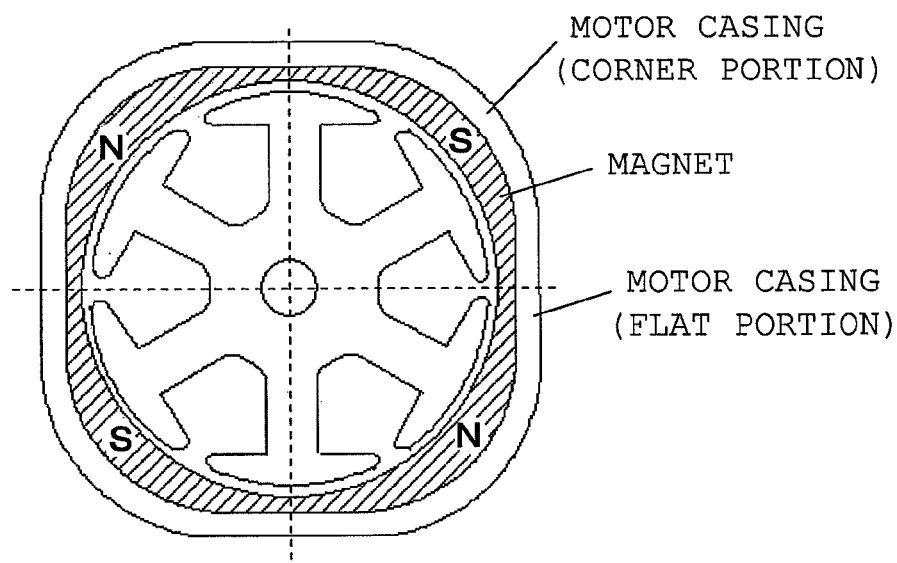
FIG. 9 is a sectional view of a motor which is described in Patent Document 3 and in which magnetic poles are disposed at corner portions between side portions of a motor casing.

In the case where no rib is press fitted, vibration becomes larger because of the following reasons. (1) Since the motor casing and the magnet are designed such that the corner portions of the magnet are press-fitted into the corner portions of the motor casing and clearances are formed between the flat side portions of the magnet and the flat wall portions of the motor casing, the rigidity of the flat side portions is low. (2) Because of restrictions involved in production, the thickness of the flat wall portions of the motor casing of a quadrangular motor is smaller than the thickness of the corner portions of the motor casing (see FIG. 8), whereby the geometrical moment of inertia drops, and the motor casing becomes more likely to be influenced by the excitation by the magnet. Therefore, as a result of generation of the energies of attraction and repulsion between the rotor and the magnet, each of the thin-walled portions of the magnet located near the centers of the flat wall portions serves as a vibration source, and causes natural vibration with large amplitude. Thus, the above-described problem occurs. FIG. 8 is a graph showing the thickness of a motor casing formed from an iron plate through press working, as measured at the corner portions and flat wall portions thereof. From the graph, which shows the minimum values (min), the average values (ave), and the maximum values (max) measured for five samples, it is found that the flat wall portions becomes thinner than the corner portions.

As can be seen from FIGS. 7(A), 7(B) and 7(C) and Table 2, as a result of the flat wall portions of the housing being fixed by means of press-fitting of ribs of the magnet, the vibration frequency increases about 11% and becomes closer to a frequency band in which the hearing sensitivity of the human ear drops. Further, the amplitude of the vibration can be reduced by about 50%. In addition, by means of bonding and fixing the outer flat surfaces of the magnet and the inner flat surfaces of the housing, the amplitude of the vibration can be reduced further by about 80%, as compared with the case where no rib is press-fitted. In the case where an attempt is made to attain the same effect as that attained through bond-fixing by merely increasing the thickness of the side wall portions of the housing, for example, the thickness of the side wall portions must be increased from 0.72 mm to about 1.1 mm. In such a case, the material cost of the housing and the size of the motor increase.

The invention claimed is:

1. A small motor having a polygonal external shape in which a field magnet having four or more poles is attached to an inner circumferential surface of a motor casing made of metal, the motor comprising:
 the motor casing having a side wall formed into a polygonal shape such that flat side portions equal in number to the poles and arcuate corner portions equal in number to the side portions and located at respective corners between the side portions are continuously joined together; and
 the field magnet which has an outer circumferential shape approximately coinciding with the inner circumferential shape of the motor casing, having magnet side portions and magnet corner portions corresponding to the side portions and corner portions, respectively, of the motor casing, and having a rib provided on outer circumferential surfaces of the magnet side portions, wherein the magnet is disposed, through press-fitting, within the motor casing such that the rib comes into contact with the inner circumferential surface of the motor casing, the magnet side portions, excluding the rib, being formed such that small clearances are formed between the magnet side portions and the side portions of the motor casing, or at least such that no pressing force acts on the magnet side portions, excluding the rib.

2. A small motor having a polygonal external shape according to claim 1, wherein the motor casing and the magnet are bonded together by means of adhesive injected into the small clearances formed between the inner circumferential surface of the motor casing and the outer circumferential surface of the magnet as a result of provision of the rib on the outer circumferential surface of the magnet.

3. A small motor having a polygonal external shape according to claim 1, wherein the rib is provided at a single position or a plurality of positions, and assumes the form of a ridge having a rectangular, arcuate, or semicircular cross section, and elongated in the longitudinal direction of the magnet.

4. A small motor having a polygonal external shape according to claim 1, wherein the rib is provided on the inner circumferential surface of the motor casing, rather than being provided on the outer circumferential surface of the magnet.

5. A small motor having a polygonal external shape according to claim 1, wherein the magnet is integrally formed into the overall shape of a ring from a magnetic plastic compound.

* * * * *